Patented Jan. 15, 1935

1,988,178

UNITED STATES PATENT OFFICE 1,988,178

INSECTICIDE AND WOOD PRESERVATIVE AND METHOD FOR PRODUCING SAME

David R. Merrill, Long Beach, Calif., assignor to Union Oil Company of California, Los Angeles, Calif., a corporation of California No Drawing. Application April 12, 1932, Serial No. 604,872

16 Claims. (Cl. 134—78.6)

The present invention relates to insecticides and wood preservatives and to methods of producing them. The invention is particularly directed to insecticides and wood preservatives adapted to prevent rot, fungus growth and infestation of termites in wood structures. Subject matter disclosed but not claimed herein is covered in my copending application Serial No. 604,871, filed April 12, 1932.

One of the chief reasons for the limited use of insecticides and wood preservatives in wooden structures to prevent rot, fungus growth, infestation with termites, etc., has been the cost of materials employed and the cost of impregnation. It is, therefore, an object of the present invention to present an insecticide and wood preservative which can be produced at a very moderate cost and which can be applied by simple means, such as by spraying.

In order to protect the wood structures against infestation by termites, rot, fungus growths, etc., it is desirable to employ a material which will both penetrate the wood and kill any termite or other insect infestation present and, also, to form a coating over the surface of the wood so that further infestation from the outer surface of the wood will be discouraged.

In order to obtain good penetration into the wood, it is desirable to employ a product made up in a relatively non-viscous solvent of the oil type rather than to use an aqueous solvent which would have the serious disadvantage of raising the grain of the wood and causing warping. In order to reduce the cost of the product, it is desirable that this solvent be a light and non-viscous petroleum product and for this purpose, such petroleum fractions as gasoline, kerosene and lubricating oils may be employed. However, these ordinary petroleum fractions are relatively non-toxic and cannot completely eradicate termites or other insects present in the wood structure. This greatly offsets the advantage of their low cost.

I have discovered that Edeleanu extract or sludge oil is considerably more toxic than ordinary petroleum fractions. Edeleanu extract is that portion of petroleum which is soluble in liquid sulfur dioxide. It is obtained by mixing a petroleum fraction such as kerosene, gas oil, lubricating oil, etc. with liquid sulfur dioxide at low temperatures. Upon settling, a stratification takes place of a lower layer of extract and a large amount of liquid sulfur dioxide and an upper layer of raffinate and a small amount of liquid sulfur dioxide. The lower layer is separated and is subjected to distillation to remove the sulfur dioxide. The remaining material is Edeleanu extract. Sludge oil is the oil recovered from the acid sludge formed in the treatment of the petroleum products with sulfuric acid. It has been found that these products contain the greater proportion of the toxic constituents of the petroleum products such as phenolic bodies, nitrogen bases and sulfur compounds. The Edeleanu extract or sludge oil may be treated by known methods to produce products which are light in color and which may be employed for impregnating the wood without serious discoloring or staining. However, in cases where the staining action is not undesirable, these products may be employed as recovered without the treatment for improving the color. Where it is desired to also form a coating on the wood structure in addition to the desired penetration, the product may be applied to the wood structure in the form of an asphalt paint produced by dissolving asphalt or other coating product in the Edeleanu extract or sludge oil and thus both the desired penetration and coating effect may be obtained. However, these products are valuable without the asphalt as a penetrating, preserving and insecticidal material for impregnating and coating of wood and other structures for protection against fungus and insect infestation.

I have further discovered that for certain applications where the toxic effect of the Edeleanu extract or sludge oil containing the toxic constituents in high concentration is insufficient for maximum effectiveness, I may supplement the toxicity of the Edeleanu extract or sludge oil by dissolving in it, either with or without the addition of asphalt or other coating material, any oil soluble toxic compound, such as carbon bisulfide, carbon tetrachloride, ethylene dichloride, copper stearate, copper naphthenate, copper oleate, lead oleate, mercuric palmitate or the like. However, supplemental toxic compounds of the type mentioned are relatively expensive in proportion to the degree of their toxicity. Consequently, their use in effective amounts would result in an appreciable increase in the cost of the finished insecticide or wood preservative. Also certain of these toxic materials are very volatile and offer only a temporary protection. It would, therefore, be very desirable to use a material of higher toxicity and lower cost. I have found that the compounds of arsenic trioxide or arsenic acid, hereinafter mentioned, are very effective and inexpensive and are well adapted for admixture with asphalt and/or the petroleum fractions, Edeleanu extract or sludge oil.

I have discovered that certain organic arsenical derivatives, such as arsenical esters, can be satisfactorily incorporated into petroleum fractions, Edeleanu extract or sludge oil to produce a relatively inexpensive and highly toxic insecticide or wood preservative. Certain of these arsenical derivatives may be directly incorporated into the petroleum solvent while others are difficultly soluble in oil and require the use of common blending agents in order to effect solution. These arsenic compounds may be used in the place of, or in addition to, the above mentioned toxic agents and may be used, as well, as supplemental toxic agents in the asphalt compositions previously described.

Types of organic arsenic compounds which may be directly dissolved in ordinary petroleum products such as gasoline, kerosene, or higher boiling petroleum distillates without the use of a common blending agent, are the arsenite esters produced as described in my co-pending application Serial No. 594,733, filed February 23, 1932. Examples of such compounds are the arsenite esters, derived from the monohydroxy alcohols, such as ethyl arsenite, methyl arsenite, etc., and also the arsenite esters derived from the complex ether alcohols, such as the arsenites of $\beta$ ethoxy ethanol (cellosolve), $\beta$ butoxy ethanol (butyl cellosolve), $\beta$ hydroxy ethyl, $\beta'$ butoxy ethyl ether (butyl carbitol), etc. These arsenite esters are readily soluble in ordinary petroleum fractions as well as in Edeleanu extract or sludge oil. Certain other arsenite esters which are not readily soluble in the above ordinary petroleum fractions or distillates but which are soluble in petroleum products composed chiefly of aromatic hydrocarbons, such as Edeleanu extract and sludge oils are the arsenites of $\beta$ hydroxy ethyl $\beta'$, methoxy ethyl ether (methyl carbitol) and $\beta$ hydroxy ethyl $\beta'$ ethoxy ethyl ether (carbitol). However, the solubility of the above in ordinary petroleum fractions or distillates, such as straight run naphtha or kerosene of the latter arsenite esters can be promoted by the use of a small amount of alcohol or other blending agents as will be described hereafter.

In addition to the aliphatic esters, I may use the aromatic esters such as phenyl arsenite, cresyl arsenite and substituted aromatic esters as para chlor phenyl arsenite or the esters of the aralkyl or aromatic alcohols such as benzyl, tolyl and xylyl arsenite and $\alpha$ and $\beta$ phenyl ethyl arsenite.

Types of other arsenical compounds which may be employed with petroleum fractions, Edeleanu extract or sludge oil are the arsenites or arsenates of organic bases. Because of the weakness of arsenic trioxide as an acid, these arsenical derivatives can be obtained only by reaction with relatively strong organic bases, such as the aliphatic amines and their substitution products in which the substituents are not so negative in character as to materially affect the strength of the base. The aliphatic amines employed may be primary, secondary or tertiary amines, or even quarternary ammonium hydroxide derivatives and the substitution products may contain as substituents hydroxyl, alkoxyl or additional amino groups. As examples of the simple amines may be mentioned amyl amine, diethyl amine and tetramethyl ammonium hydroxide and of the diamines, ethylene diamine. As examples of the substituted amines containing substituents which do not affect the strength of the base to a serious extent may be mentioned $\alpha$-amino $\beta$-ethoxy ethane, $\beta$, $\beta'$ di- aminoethyl ether, $\beta$-amino $\beta'$-chloroethyl ether and the like.

The solubility of these arsenites and arsenates of organic bases will vary considerably according to the character of the base, with, in general, hydroxyl groups tending to promote solubility in water and oxygenated solvents and the bases in which the effect of the hydrocarbon groups predominates tending away from water solubility and towards solubility in oil. Such solubility in oil, however, will frequently be insufficient to give a final product of the desired arsenic concentration. These can be promoted by blending agents.

I have further discovered that the solubility of these arsenic compounds, particularly the esters, which are difficultly soluble in oil may be effected by the use of blending agents. These blending agents will vary in type and amount according to the solubility characteristics of the particular arsenical derivative. The common blending agents may be grouped or classified into three general groups according to their type of solvent action.

The first group is made up of compounds of the readily water soluble type which are usually not soluble in oil without the use of supplementary blending agents. Supplementary blending agents which may be used for effecting solution of the arsenites and arsenates of organic bases will be described in the third group. In the present group are the polyhydroxy derivatives such as ethylene glycol, diethylene glycol, propylene glycol, glycerine, etc. Blending agents belonging to this group will hereafter be termed "Group 1—Blending agents".

The second group is composed of compounds which are miscible with oil or can be made miscible by the use of small amounts of supplementary blending agents and which in many cases have only limited solubility in water. This group includes the alcohols, such as methyl, ethyl, isopropyl and higher alcohols; the ethers, such as ethyl and isopropyl ether and cyclic ethers, such as dioxan; the esters, such as methyl, ethyl and amyl acetate; the ketones, such as acetone and higher ketones available commercially as acetone oil; and various poly substituted derivatives of mixed character, among which may be mentioned ether alcohols, such as $\beta$-ethoxy ethanol, commonly known as cellosolve, $\beta$-hydroxy ethyl $\beta'$-ethoxy ethyl ether (carbitol), $\beta$-hydroxy ethyl $\beta'$-butoxy ethyl ether (butyl carbitol), $\beta$-methoxy ethanol (methyl cellosolve), $\beta$-butoxy ethanol (butyl cellosolve); the ester derivatives of such ether alcohols as the acetate of $\beta$-ethoxy ethanol (cellosolve acetate); hydroxy ketones, such as diacetone alcohol; the halogen derivatives of the oxygenated compounds mentioned, such as $\beta$ $\beta'$ dichloroethyl ether and ethylene chlorhydrin. Blending agents belonging to this group will hereafter be termed "Group 2—Blending agents".

In the third group are compounds which have little or no solubility in water and poor solvent power for organic salts, but are useful as auxiliary blending agents for the blending agents in the above first group. In this group are the aromatic hydrocarbons, such as benzene, toluene and xylene; the terpenes, such as turpentine; and the halogen derivatives, such as carbon tetrachloride, chloroform and ethylene dichloride. Blending agents belonging to this group will hereafter be termed "Group 3—Blending agents".

The use of the above blending agents in the first and second groups and of the auxiliary blending agents of the third group is dependent upon the solubility of the arsenical preparation and, also upon the character of the petroleum fraction to be employed as the chief constituent in the insecticide or wood preservative. For example, if it were desired to dissolve the arsenite of triethanolamine in Edeleanu extract, one may proceed by employing a blending agent of the first or second group, such as anhydrous ethyl alcohol in order to effect the solution, but if it were desired to dissolve the same arsenical preparation in an ordinary petroleum fraction, such as the unextracted kerosene, with the same blending agent, it would necessitate the use of an auxiliary blending agent of the third group, such as benzene. The reason for this is due to the fact that the Edeleanu extract contains a higher concentration of aromatic hydrocarbons than the ordinary petroleum fractions from which the Edeleanu extract has been made.

It is to be preferred that the blending agents to be used with the arsenic salts of organic nitrogen bases shall not have a solvolytic effect on these salts. Alcohols due to the presence of the (OH) group have such an effect and it is to be preferred that the H in the OH group be substituted, as for instance, ketones, ethers and esters. Thus, acetone, methyl ethyl ketone, methyl propyl, ethyl propyl, propyl butyl and other ethers preferably of relatively high boiling point may be used. Esters, such as ethyl acetate, butyl acetate, cyclobutyl, cyclopentyl, cyclohexyl acetates and the esters of the higher acids such as propionic, butyric and other organic acids may be used.

While I have particularly stressed the use of the organic arsenic compounds such as esters and salts of organic bases with petroleum fractions including Edeleanu extract and sludge oil as well as with ordinary distillates, it is to be understood that these organic arsenic compounds may be used with other diluents, solvents or carriers, as for instance, any of the blending agents in Group 1 or 2 with or without those of Group 3 in accordance with the principles set out herein. The use of Edeleanu extract, as above, is preferred because of its cheapness and effectiveness.

It is to be observed that asphalt may be used to form a paint containing the above toxic agents, especially where the solvent or diluent is miscible with petroleum oil or is used with additional blending agents to promote solution.

In accordance with the above discussion, it will be observed that it is an object of the present invention to produce an insecticide and wood preservative comprising a petroleum fraction. It is a further object to produce an insecticide or wood preservative by treating petroleum or its fractions with liquid sulfur dioxide or sulfuric acid.

It is a further object of this invention to produce an insecticide and wood preservative comprising a mixture of Edeleanu extract and/or sludge oil and an asphalt adapted to leave a coating of asphalt on the surface of the wood when applied thereto.

It is another object of this invention to produce an insecticide and wood preservative comprising a mixture of Edeleanu extract and/or sludge oil and/or asphalt or other coating material and a supplemental toxic compound which is soluble in the mixture.

It is a further object of this invention to produce an insecticide and wood preservative comprising a mixture of a petroleum fraction, Edeleanu extract or sludge oil or mixtures thereof and a supplemental toxic agent composed of an organic arsenical preparation of the type of arsenites or arsenates of the amino group or arsenite esters.

It is a further object to provide a method for effecting solution of such arsenical preparations in petroleum fractions, Edeleanu extract or sludge oil in cases where their solubility is inappreciable or where such compounds are not totally soluble therein.

It is a further object of this invention to effect solubility of such organic arsenical preparations by means of blending agents and also, supplemental blending agents.

As specific examples, by way of illustration and without any intention of limiting my invention, I may proceed to produce satisfactory insecticides or fungicides by the following methods.

In order to produce an Edeleanu extract suitable for the specified purposes, 100 liters of a kerosene fraction having a boiling range between 350° and 550° F., preferably although not necessarily produced without cracking, are cooled and mixed with 85 liters of liquid sulfur dioxide. The temperature of admixture should be kept fairly low or at approximately 10° F. or lower. The mixture is permitted to settle in order to effect a stratification of a lower layer of extract and an upper layer of raffinate, both containing sulfur dioxide. The layer of extract is withdrawn and subjected to distillation to remove the sulfur dioxide. The material remaining in the still is Edeleanu extract, which is high in phenolic bodies, nitrogen bases, naphthenic acids, and sulfur bodies and is relatively highly aromatic in nature and is thus suitable for use as an insecticide or wood preservative.

In case it were desired to use the product on wood structures where a staining action is undesirable, the kerosene fraction may be preliminarily treated with a small amount of 98% sulfuric acid which will effect a removal of the color forming bodies. The extract produced by the subsequent treatment of the thus preliminarily refined kerosene has a light color and may be employed on wood structures without appreciably causing staining. If desired, the acid treatment for removal of color forming bodies may be effected subsequent to extraction with liquid sulfur dioxide and removal of the sulfur dioxide in the extract by distillation.

In order to produce an insecticide and wood preservative which has characteristics of both penetration into the wood and will also form a coating on the outer surface, I may take approximately 40 parts of the above Edeleanu extract and mix therewith approximately 60 parts of melted asphalt. The particular grade of asphalt which may be employed for this purpose will depend, of course, upon the climatic conditions of the locality of application, it being desirable to employ an asphalt which is not too brittle in extremely cold weather and which will not run in hot weather. The grade of asphalt to be employed will be readily understood by those skilled in the art.

For some applications where the toxicity of the Edeleanu extract is insufficient to accomplish the desired end, the extract may be supplemented with a suitable quantity of additional toxic compounds. The mixture of Edeleanu extract and supplemental toxic agent may be used alone as a spray or impregnating agent or by adding asphalt, as previously described, may be used as a preservative paint. If it is desired, some of the more expensive toxic agents may be employed for this purpose, such as carbon bisulfide or carbon tetrachloride. I prefer to add a mixture composed of 10% of each of these supplemental toxic compounds, i. e. 10 parts of carbon bisulfide, 10 parts of carbon tetrachloride to 80 parts of Edeleanu extract which may be produced from either preliminarily treated or untreated kerosene as above stated. Also, a suitable amount of asphalt may be incorporated into the composition when a coating effect is desired.

The following is a procedure for the production of blends containing arsenite esters employing Edeleanu extract as the chief component in the insecticide or wood preservative. The amount to be used is based upon a 2% content of arsenic in the final blend. This amount is sufficient to exterminate any termite infestation present in wood structures. In general, the lower the molecular weight of the alcohol from which the arsenite ester is produced, the higher will be the arsenic content of the esters. For example, to produce 100 pounds of arsenical preparation, approximately 7 pounds of amyl arsenite containing approximately 28% of arsenic may be mixed with 93 pounds of Edeleanu extract. Inasmuch as amyl arsenite is also soluble in straight run naphtha or kerosene, the same proportions of materials may be employed when using the latter petroleum fractions. When employing octyl arsenite as the toxic compound containing approximately 21% of arsenic, it would be necessary to mix approximately 9.5 pounds of this substance with 90.5 pounds of Edeleanu extract or straight run naphtha. A similar procedure should be followed when using other arsenite esters which are soluble in either straight run distillates or in aromatic distillates. Such arsenite esters are cellosolve arsenite and butyl carbitol arsenite.

While most of the arsenite esters are soluble in both aromatic petroleum fractions, such as Edeleanu extract, and in straight run naphtha or kerosene, others, such as carbitol and methyl carbitol, are soluble only in the aromatic hydrocarbons and not in the straight run fractions. The solubility of the latter arsenite esters in straight run fractions may be promoted by the use of requisite amounts of a common solvent mentioned in Group 2—Blending agents, such as ethyl alcohol. However, the use of soluble arsenite esters, such as those of cellosolve and butyl carbitol, in straight run products is to be preferred on account of their lower cost of production. To illustrate, 100 pounds of arsenical preparation may be made by mixing 9.5 pounds of carbitol arsenite containing 21% of arsenic with 90.5 pounds of an aromatic distillate such as Edeleanu extract. The same results may be obtained by mixing the above amount of carbitol arsenite with 90.5 pounds of a mixture of a straight run distillate and adding 50% of absolute alcohol.

While triethanolamine is primarily an amine, its behavior is similar to alcohol when reacted with arsenious acid to form the arsenical ester. The arsenic is not linked through the nitrogen as is the case of simple amines but rather is linked through the hydroxyl groups. Consequently, the arsenite of triethanolamine is not to be considered as an amine salt but rather as an ester. However, its use is not very desirable in arsenical preparations since the solubility of triethanolamine arsenite is inappreciable in both Edeleanu extract and straight run petroleum fractions. It may be made soluble in Edeleanu extract by the use of a blending agent in Group 2—Blending agents, such as absolute alcohol, and in straight run fractions by the use of both a blending agent in Group 2—Blending agents, such as absolute alcohol, and a blending agent in Group 3—Blending agents, such as benzene. However, the use of these blending agents adds greatly to the cost of producing the arsenical preparation. However, a typical procedure for the production of blends of triethanolamine arsenite and containing 1% arsenic trioxide in the final blend which is sufficient for many purposes is as follows:

To produce 10 liters of the final blend, 85 grams of arsenic trioxide is mixed with 135 grams of commercial triethanolamine consisting of about 78% triethanolamine, 16% diethanolamine, 6% monoethanolamine. The mixture is heated gently to about 200° F. whereupon the arsenic trioxide dissolves in the course of a few minutes. To the mixture, which then contains the arsenite derivative is added, while still warm, 2 liters of 200 proof completely denatured alcohol in which the arsenical derivative is extremely soluble. Approximately 8 liters of a suitable fraction, such as, for example, one with 300–425° F. boiling range from Edeleanu extract from the treatment of kerosene or sludge oil is then added and mixed to form a homogenous solution which is ready for application to the wood structure.

For some applications, an insecticide of higher arsenic concentrations, for example 5% arsenic trioxide, is desirable. This can be readily produced by using somewhat more alcohol in proportion to the Edeleanu extract or sludge oil fraction.

In instances where it is desirable to employ a straight run fraction, such as kerosene, with the arsenical derivative of an organic base and where miscibility is inappreciable even with the use of a blending agent, such as anhydrous alcohol, the miscibility may be effected by employing a suitable amount of an auxiliary blending agent of an aromatic hydrocarbon, such as benzene, toluene, etc., mentioned in Group 3—Blending agents. However, this adds greatly to the cost of production and, therefore, the use of straight run petroleum fractions is generally to be avoided. Its employment usually results in the use of proportionally increasing amounts of common blending agents, such as anhydrous alcohol and also in the use of large quantities of the auxiliary blending agents such as benzene. To show the advantage in the use of Edeleanu extract solvent rather than kerosene, it may be mentioned that in order to obtain a solution of triethanolamine arsenite containing 1% arsenic trioxide in kerosene, it would be necessary to employ not only somewhat more than 20% of anhydrous alcohol, but also, approximately the same amount of benzene in order to bring about solution of the alcohol in kerosene.

The use of organic arsenical derivatives of the type disclosed for forming arsenical derivatives soluble in non-aqueous solvents has the further advantage that such solutions are often compatible with moderate concentrations of copper compounds because of formation of complex compounds, probably of the type of $Cu(NH_2R)_4(CH_3COO)_2$, when R is the organic radical. Such complex compound formation permits the preparation of either a copper bearing non-aqueous solution or one containing both copper and arsenic. The copper has very desirable fungicidal properties which are not present with arsenic except at the higher concentrations. Copper hydroxide or acetate, for example, with addition of stoichiometrical excess of triethanolamine, after solution in anhydrous alcohol may be combined with the light fraction of Edeleanu kerosene extract as a fungicide and combined also with the triethanolamine as a fungicide and insecticide. The permissible concentrations for a stable solution will, of course, vary with the character and strength of the organic base and the excess employed, the relative proportions of copper and arsenic and the type of solvent used. Under suitable conditions, zinc and mercury compounds of the same general character as copper can also be used with the arsenical derivatives to supplement the fungicidal properties of the latter.

The fungicidal properties of the arsenite esters, either in Edeleanu extract, sludge oil or in straight run fractions and either with or without the use of a coating agent such as asphalt, may not be sufficient for certain applications. These may also be supplemented by the use of copper compounds so that the wood treatment may be adequate to protect against both termite and fungus attack. For this purpose, it has been found that copper derivatives such as copper naphthenates or oleates, if properly dehydrated, may be employed in oil solutions containing the arsenite esters. The use of such compounds is particularly advantageous since it has been found that copper napthenates or oleates do not react with the arsenical esters to produce insoluble copper arsenites or arsenates as would be the case when these napthenates or oleates are admixed with ordinary arsenites or arsenates, such as sodium or calcium arsenite or arsenate.

In order to prevent both termite and fungus attack, the impregnating material should contain approximately the equivalent of 2% of arsenic and the equivalent of 1% of copper. These proportions may be varied, however, within wide limits, depending upon the degree of protection that is required. The above suggested proportions of toxic ingredients should not be limiting since the use of greater or lesser amounts of either of the toxic agents may ultimately be desirable. A solution which contains these amounts of arsenic and copper may be prepared as follows:

Ten (10) pounds of copper naphthenate containing 10% of copper, 9.5 pounds of carbitol arsenite containing 21% of arsenic may be dissolved in 80.5 pounds of an aromatic distillate such as kerosene Edeleanu extract or the same amount of a mixture of a straight-run distillate and 50% of absolute alcohol. The weight of copper naphthenate required to give the desired percent of copper in the resulting solution is a function of the molecular weight of the naphthenic acids used in the preparation of the copper naphthenate. Similarly, the weight of the arsenite ester to be used in the preparation of the treating solution is a function of the amount of arsenic in the ester. The above example is, therefore, to be considered as typical of only one of the numerous solutions that can be prepared with various copper naphthenates and the various arsenite esters.

The use of ordinary petroleum oils as carriers for the arsenic and copper compounds in wood preservation, of course, involves some fire hazard which can be decreased by the use of relatively high boiling oils like gas oil or heavy Edeleanu extract fractions. However, an excessively high boiling oil is undesirable because the accompanying increase in viscosity hinders penetration.

In the utilization of the insectidal and fungicidal perparations containing arsenite esters, it has been found that these will readily hydrolyze in water to precipitate arsenic trioxide. This tendency towards hydrolysis presents the favorable aspect that once the esters have been distributed through the wood, any contact with water will effect a deposit of insoluble arsenic trioxide which will remain distributed through the wood and give permanent protection against termite attack. However, in cases where the wood contains considerable moisture, penetration of the arsenical preparation would be difficult. Therefore, it is necessary to kiln-dry the wood thoroughly prior to the application unless the wood is of exceptionally open character.

In general, it is found that there is a much greater tendency for impregnation with the grain of the wood than across the grain but penetration may be effected across the grain even without recourse to the vacuum-pressure process if the lumber be passed under a cylinder equipped with small spikes which prick small holes at intervals in the surface. These holes would serve to lead the solution into the wood from which points flow would then take place with the grain. Such pricking operation would have very litle deleterious effect on the structural strength but might permit the satisfactory applicaiton of the material by spraying, brushing or dipping rather than by the vacuum-pressure treatment.

Where asphalt is added to the mixture to produce an asphalt paint carrying the toxic agent the mixture may be sprayed or painted on the wood to provide a preservative coating on the wood or other surface to be protected.

The above disclosure is to be taken merely as illustrative of a preferred embodiment of my invention and is not to be considered limiting, since many variations thereof may be made within the scope of the following claims.

I claim:

1. An insecticide and wood preservative comprising asphalt and petroleum fractions substantially all of which are soluble in liquid sulfur dioxide.

2. An insecticide and wood preservative comprising asphalt and Edeleanu extract.

3. An insecticide and wood preservative comprising approximately 40 parts of petroleum fractions soluble in liquid sulfur dioxide and approximately 60 parts of asphalt.

4. An insecticide and wood preservative comprising petroleum fractions substantially all of which are soluble in liquid sulfur dioxide, asphalt and a supplemental toxic agent.

5. An insecticide and wood preservative comprising petroleum fractions substantially all of which are soluble in liquid sulfur dioxide and a mixture of carbon bisulfide and carbon tetrachloride.

6. An insecticide and wood preservative comprising petroleum fractions substantially all of which are soluble in liquid sulfur dioxide, asphalt and a mixture of carbon bisulfide and carbon tetrachloride.

7. An insecticide and wood preservative comprising petroleum fractions soluble in liquid sulfur dioxide, asphalt, an arsenic salt of an amine and a blending agent capable of dissolving said salt in said petroleum fractions.

8. An insecticide and wood preservative comprising a petroleum hydrocarbon, asphalt and arsenic ester.

9. An insecticide and wood preservative comprising a petroleum hydrocarbon, asphalt and arsenic ester of triethanolamine.

10. An insecticide and wood preservative comprising a petroleum hydrocarbon, asphalt and an arsenite ester of an aliphatic alcohol.

11. An insecticide and wood preservative comprising a petroleum hydrocarbon, asphalt and an arsenite ester of a monohydroxy alcohol.

12. An insecticide and wood preservative comprising a petroleum hydrocarbon, asphalt, arsenic ester and a supplemental toxic compound compatible with said arsenic ester.

13. An insecticide and wood preservative comprising a petroleum hydrocarbon, asphalt, arsenic ester and metallic naphthenate compatible with said arsenic ester.

14. An insecticide and wood preservative comprising a petroleum hydrocarbon, asphalt, arsenic ester and copper naphthenate.

15. An insecticide and wood preservative comprising a petroleum hydrocarbon, asphalt, arsenic ester and zinc naphthenate.

16. An insecticide and wood preservative comprising a petroleum hydrocarbon, asphalt, arsenic ester and mercury naphthenate.

DAVID R. MERRILL